(12) United States Patent
Vetere, II et al.

(10) Patent No.: US 11,479,157 B2
(45) Date of Patent: Oct. 25, 2022

(54) RETRACTABLE BOLSTERS FOR A REVERSIBLE SEAT

(71) Applicants: Magna Seating Inc, Aurora (CA); Louis Vetere, II, Commerce Township, MI (US); Michael D Nacy, Lake Orion, MI (US); Kai Zhao, Rochester Hills, MI (US); Detjon Marini, White Lake, MI (US); Cheikh Dioum, Rochester Hills, MI (US)

(72) Inventors: Louis Vetere, II, Commerce Township, MI (US); Michael D Nacy, Lake Orion, MI (US); Kai Zhao, Rochester Hills, MI (US); Detjon Marini, White Lake, MI (US)

(73) Assignee: Magna Seating Inc, Aurora (CA)

( * ) Notice: Subject to any disclaimer, the term of this patent is extended or adjusted under 35 U.S.C. 154(b) by 178 days.

(21) Appl. No.: 17/050,887

(22) PCT Filed: Apr. 29, 2019

(86) PCT No.: PCT/US2019/029642
§ 371 (c)(1),
(2) Date: Oct. 27, 2020

(87) PCT Pub. No.: WO2019/210302
PCT Pub. Date: Oct. 31, 2019

(65) Prior Publication Data
US 2021/0229582 A1    Jul. 29, 2021

Related U.S. Application Data

(60) Provisional application No. 62/663,353, filed on Apr. 27, 2018.

(51) Int. Cl.
*B60N 2/90* (2018.01)
*B60N 2/20* (2006.01)

(52) U.S. Cl.
CPC ............. *B60N 2/986* (2018.02); *B60N 2/203* (2013.01); *B60N 2205/30* (2013.01)

(58) Field of Classification Search
None
See application file for complete search history.

(56) References Cited

U.S. PATENT DOCUMENTS 5,278,420 A    1/1994  Sugiyama
6,199,945 B1 *  3/2001  Kim ....................... B60N 2/203
                                          297/238

(Continued)

FOREIGN PATENT DOCUMENTS

DE    102005050975    4/2007
FR    2863558          6/2005

(Continued)

*Primary Examiner* — David E Allred
(74) *Attorney, Agent, or Firm* — Miller Canfield

(57) ABSTRACT

A reversible seat assembly for use in an automotive vehicle has a seat cushion, a seat back and a bolster. The seat cushion extends between a front end and a rear end. The bolster is operatively coupled to the seat cushion for movement between a deployed position when the seat back is adjacent the rear or front end of the seat cushion and a retracted position when the seat back is between the rear and front ends of the seat cushion to allow the seat back to rotate between a forward-facing seating position and a rearward-facing seating position.

17 Claims, 21 Drawing Sheets

(56) References Cited

U.S. PATENT DOCUMENTS

| | | | |
|---|---|---|---|
| 6,715,825 B2 | 4/2004 | Tame | |
| 7,140,680 B2 | 11/2006 | McMillen et al. | |
| 7,644,982 B2 * | 1/2010 | Paluch | B60N 2/203 297/94 |
| 9,045,062 B2 * | 6/2015 | Deimen | B60N 2/203 |
| 9,145,073 B2 * | 9/2015 | Andersson | B60N 2/986 |
| 9,809,131 B2 | 11/2017 | Line et al. | |
| 11,059,396 B2 * | 7/2021 | Zhao | B60N 2/203 |
| 2004/0140705 A1 * | 7/2004 | McMillen | B60N 2/64 297/378.12 |
| 2005/0253433 A1 * | 11/2005 | Brown | B60N 2/233 297/283.3 |
| 2008/0290700 A1 * | 11/2008 | Paluch | B60N 2/203 297/95 |
| 2009/0322133 A1 * | 12/2009 | Yamada | B60N 2/3011 297/284.9 |
| 2010/0052388 A1 * | 3/2010 | Holdampf | B60N 2/206 297/284.9 |
| 2018/0290570 A1 * | 10/2018 | Raines | B60N 2/914 |
| 2019/0299819 A1 * | 10/2019 | Zhao | B60N 2/203 |

FOREIGN PATENT DOCUMENTS

| | | | |
|---|---|---|---|
| KR | 1020150076836 | 7/2015 | |
| WO | WO-2004043207 A2 * | 5/2004 | B60N 2/01508 |
| WO | WO-2019011357 A1 * | 1/2019 | A47C 4/04 |
| WO | WO-2019183619 A1 * | 9/2019 | B60N 2/0292 |

\* cited by examiner

RETRACTABLE BOLSTERS FOR A REVERSIBLE SEAT

CROSS-REFERENCE TO RELATED APPLICATIONS

This application claims priority to U.S. provisional patent application No. 62/663,353, filed Apr. 27, 2018, which is incorporated herein by reference.

TECHNICAL FIELD

Example embodiments relate to a reversible seat assembly for an automotive vehicle.

BACKGROUND OF THE INVENTION

Reversible seat assemblies for use in automotive vehicles are well known in the art. For example, U.S. Pat. Nos. 6,715,825 and 7,644,982, which are incorporated herein by reference, disclose seat assemblies that allow a user to position the seat back between a forward-facing position and a rearward-facing position. The seat assembly in U.S. Pat. No. 7,644,982 includes a pair of links 94, 96 for positioning the seat back 14 between a forward-facing position A and a rearward-facing position B. The seat assembly also includes a cushion control mechanism consisting of a pair of forward 200 and rearward 202 linkages for automatically controlling the seat cushion incline angle in response to movement of the seat back.

FIG. 1 illustrates another reversible seat assembly 10 for use in an automotive vehicle in accordance with the prior art. The seat assembly 10 includes a seat cushion 12 and a seat back 14 operatively coupled to the seat cushion 12 for supporting a seat occupant in a generally upright seating position. The seat cushion 12 includes a cushion frame 16 and a cushion pad 18, and the seat back 14 includes a recliner bracket 20. The seat cushion 12 is supported above a floor in the vehicle by a seat riser 22. Reversing links 24, 26 extend between an upper end pivotally coupled to the recliner bracket 20 at pivots 28, 30 respectively, and a lower end pivotally coupled to the seat riser 22 at pivots 32, 34 respectively.

As depicted in FIG. 1, in these prior art reversible seat assemblies 10, during the transition between the forward-facing position and the rearward-facing position, the recliner bracket 20 would pass alongside the seat cushion 12. Due to the overlap between the recliner bracket 20 and the seat cushion 12, the seat cushion 12 has to be narrowed to avoid contact with the recliner bracket 20 during the reversing process. However, a narrower seat cushion 12 is less comfortable for an occupant. Conversely, the width of the seat assembly 10 could be made wider while the width of the seat cushion 12 remains the same to maintain occupant comfort. However, a wider seat assembly 10 is more difficult to package within a vehicle.

SUMMARY OF THE INVENTION

According to one embodiment, there is provided a reversible seat assembly for use in an automotive vehicle comprising a seat cushion, a seat back and a bolster. The seat cushion extends between a front end and a rear end. The bolster is operatively coupled to the seat cushion for movement between a deployed position when the seat back is adjacent the rear or front end of the seat cushion and a retracted position when the seat back is between the rear and front ends of the seat cushion.

According to another embodiment, there is provided a reversible seat assembly for use in an automotive vehicle comprising a seat cushion, a seat back, a linkage and a bolster. The linkage operatively couples the seat back with the seat cushion. The bolster is operatively coupled with the linkage, and has a retracted position and a deployed position. The linkage moves the seat back between a forward-facing position and a rearward-facing position. The linkage moves the bolster towards the retracted position when the seat back is moved towards a central position between the forward-facing position and the rearward-facing position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1:
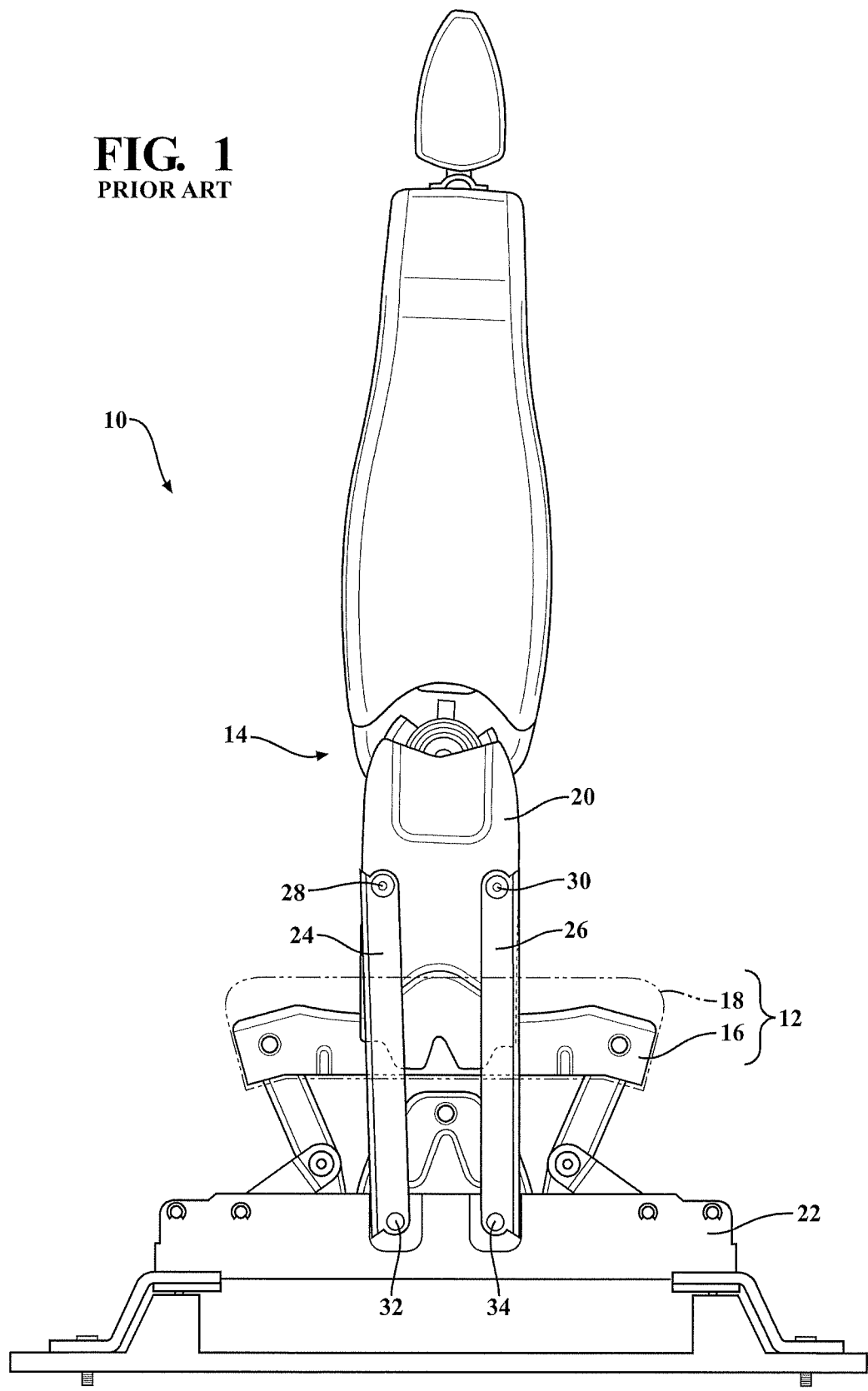
FIG. 1 is a side view of a reversible seat assembly in a neutral position in accordance with the prior art.

FIGS. 2-22 illustrate one embodiment of a reversible seat assembly 50 for use in an automotive vehicle. The seat assembly 50 includes a seat cushion 52 and a seat back 54 operatively coupled to the seat cushion 52 for supporting a seat occupant in a generally upright seating position. The seat cushion 52 is supported above a floor in the vehicle by an outboard seat riser 56 and an inboard seat riser (not shown). Although the Figures and description below refer to the outboard side of the seat assembly 50, the present invention includes corresponding structures on the inboard side of the seat assembly.

The seat cushion 52 extends longitudinally between a front end 58 and an opposite rear end 60, lateral between opposite first and second sides, and includes a cushion frame 62 and a cushion pad (not shown). The seat back 54 includes a recliner bracket 64 operatively coupled to the seat riser 56 for supporting the occupant in the seat assembly 50.

The seat assembly 50 also includes a seat cushion control mechanism or linkage, generally shown at 66, for controlling the position of the cushion frame 62, and therefore the seat cushion 52, in response to movement of the seat back 54 between the forward-facing seating position and the rearward-facing seating position. The control mechanism 66 is a single degree-of-freedom system, and includes reversing links 68, 70, cushion linkages 72, and a cushion pivot tower 74.

Reversing links 68, 70 extend between an upper end pivotally coupled to the recliner bracket 64 at pivots 76, 78 respectively, and a lower end pivotally coupled to the seat riser 56 at pivots 80, 82 respectively. The cushion pivot tower 74 is mounted, and fixedly secured, onto seat riser 56. A cushion frame pivot 84 resides within an elongated travel slot 86 in the cushion frame 62 to pivotally and slidably couple the cushion frame 62 to the cushion pivot tower 74. The cushion pivot tower 74 includes an actuation slot 88 formed therein and defining two projections 90, 92 extending from the top edge of the actuation slot 88. The two projections 90, 92 are spaced apart between two home positions 89, 93, and a neutral position 91 is between the two projections 90, 92.

Figure 2:
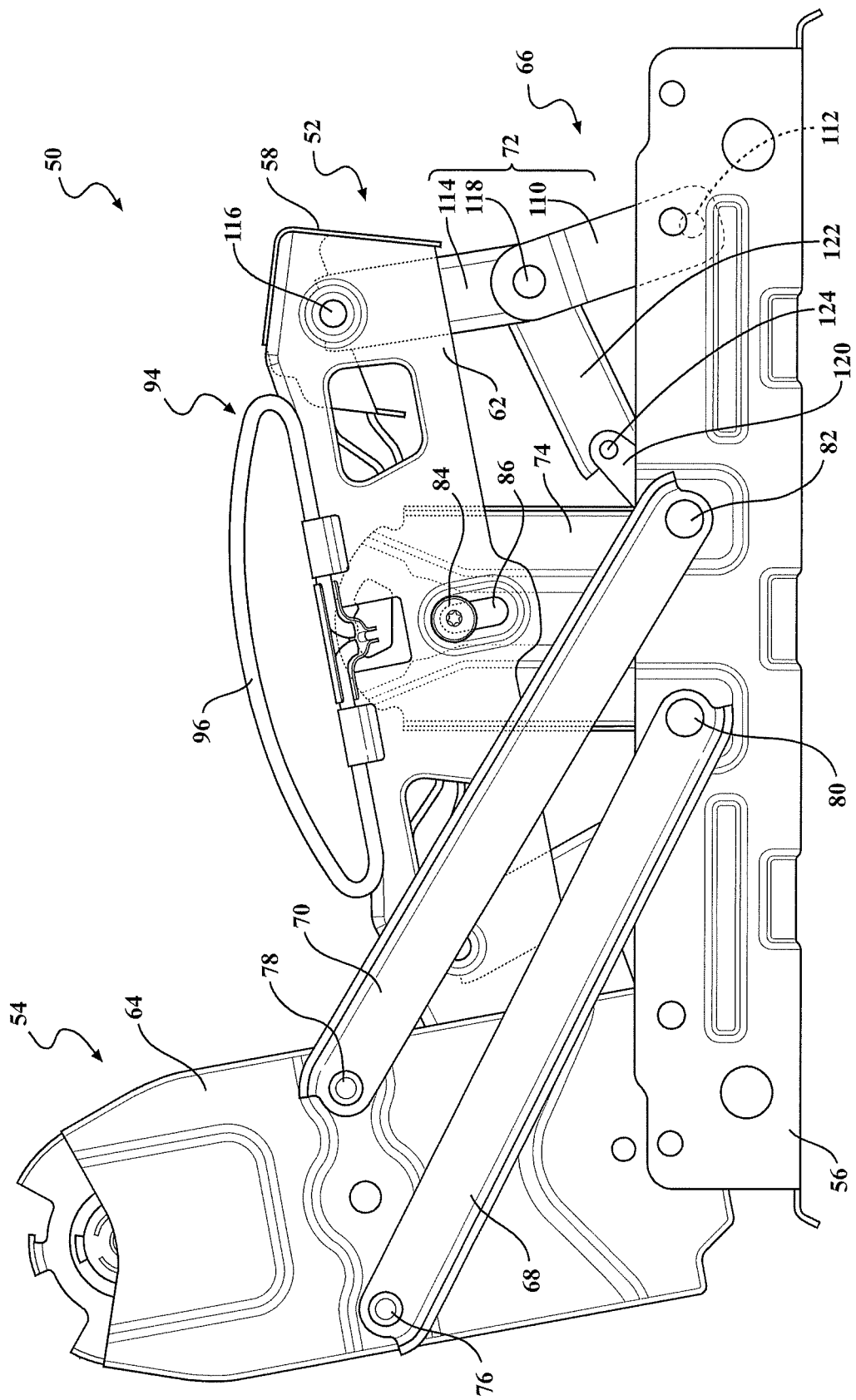
FIG. 2 is a fragmentary outer side view of the reversible seat assembly in the forward-facing seating position in accordance with one embodiment of the present invention.
Figure 4:
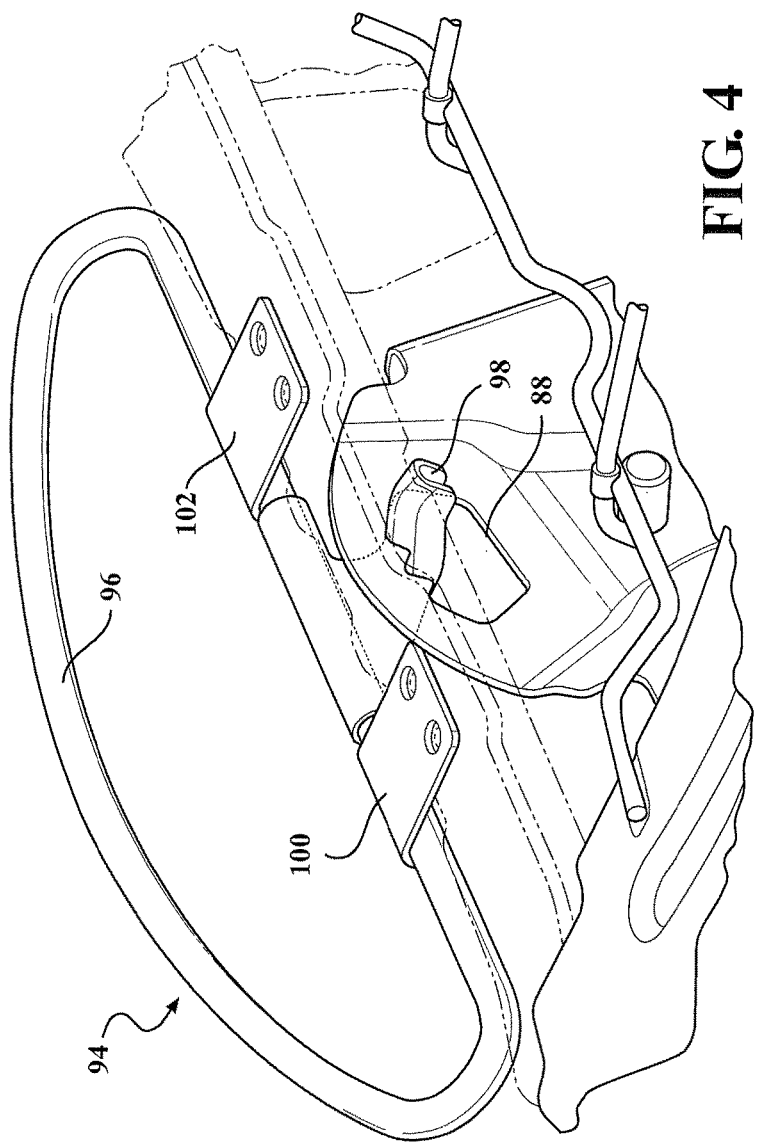
FIG. 4 is a fragmentary inner perspective view of the bolster assembly on the reversible seat assembly of FIG. 2.
Figure 3:
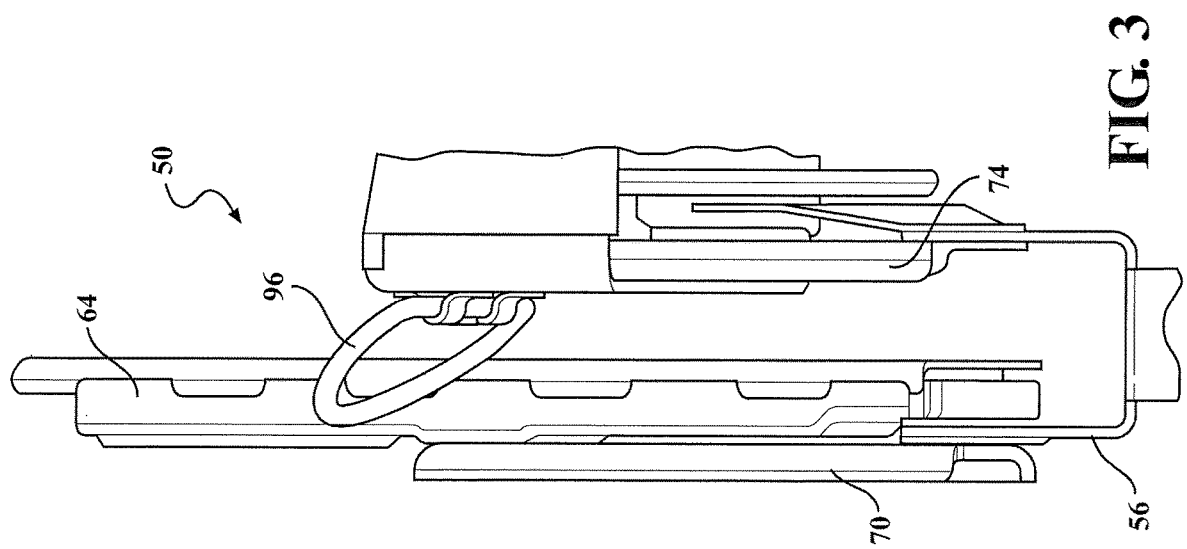
FIG. 3 is a fragmentary front view of the reversible seat assembly of FIG. 2.
Figure 5:
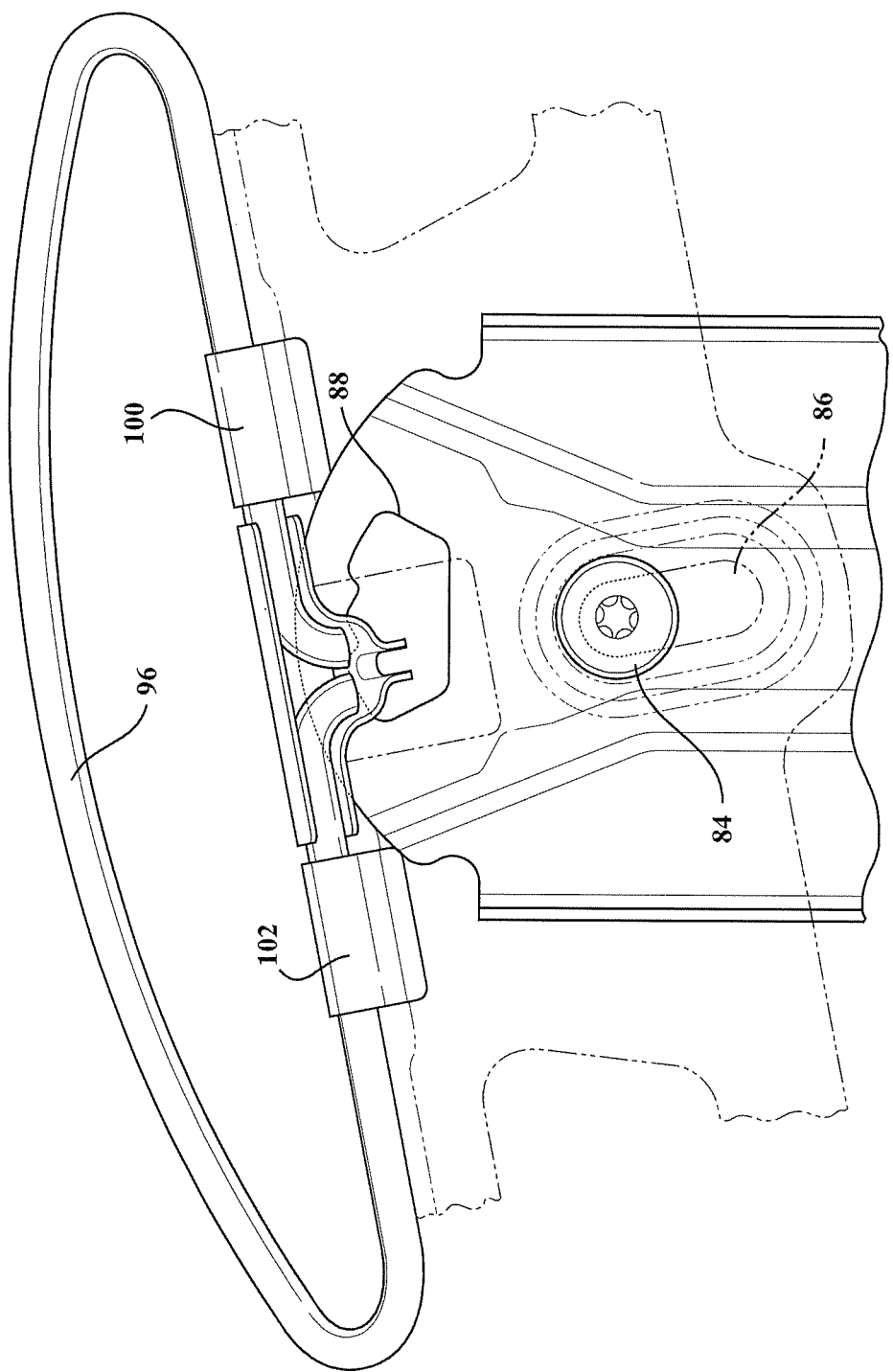
FIG. 5 is a fragmentary outer side view of the bolster assembly on the reversible seat assembly of FIG. 2.
Figure 6:
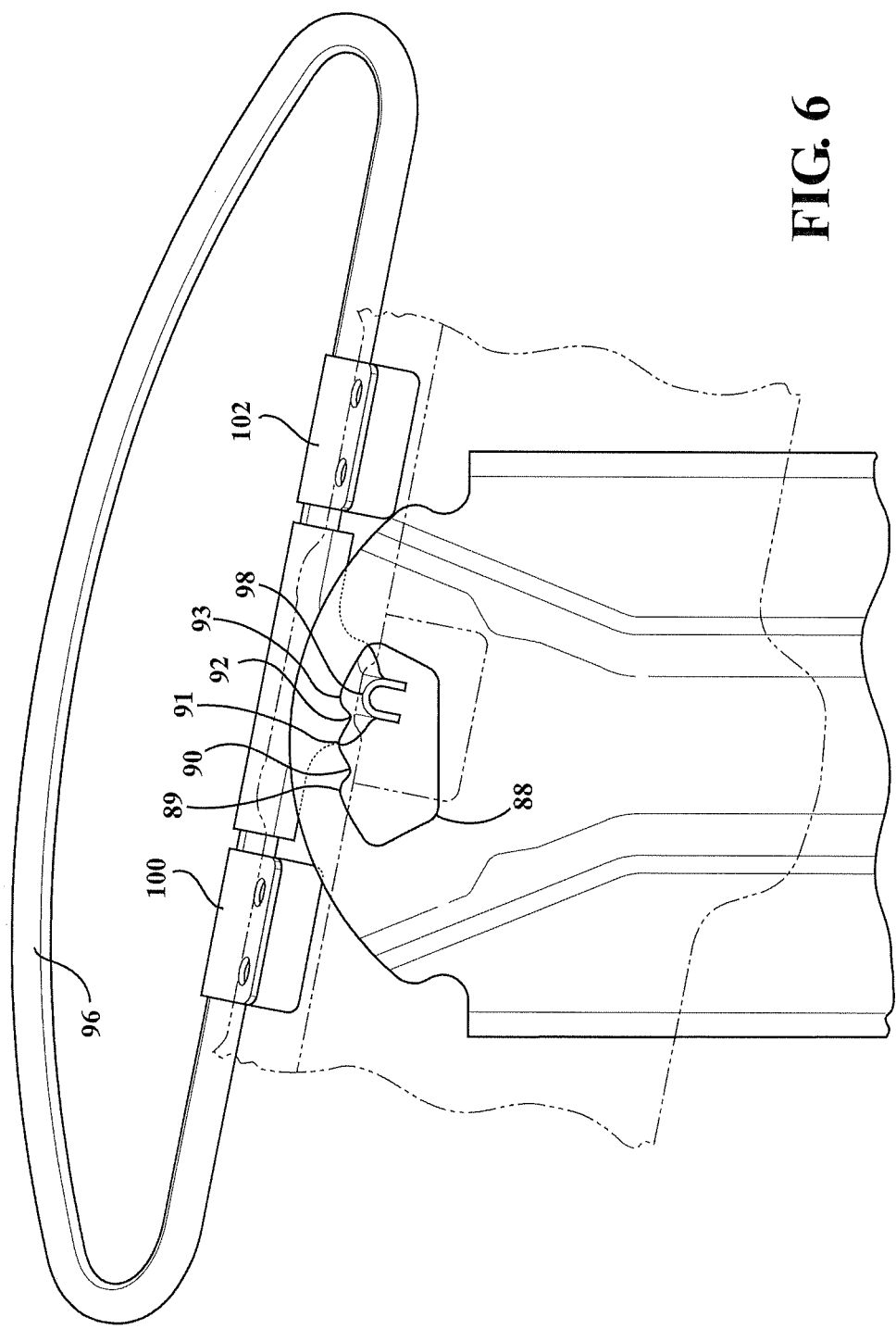
FIG. 6 is a fragmentary inner side view of the bolster assembly on the reversible seat assembly of FIG. 2.
Figure 7:
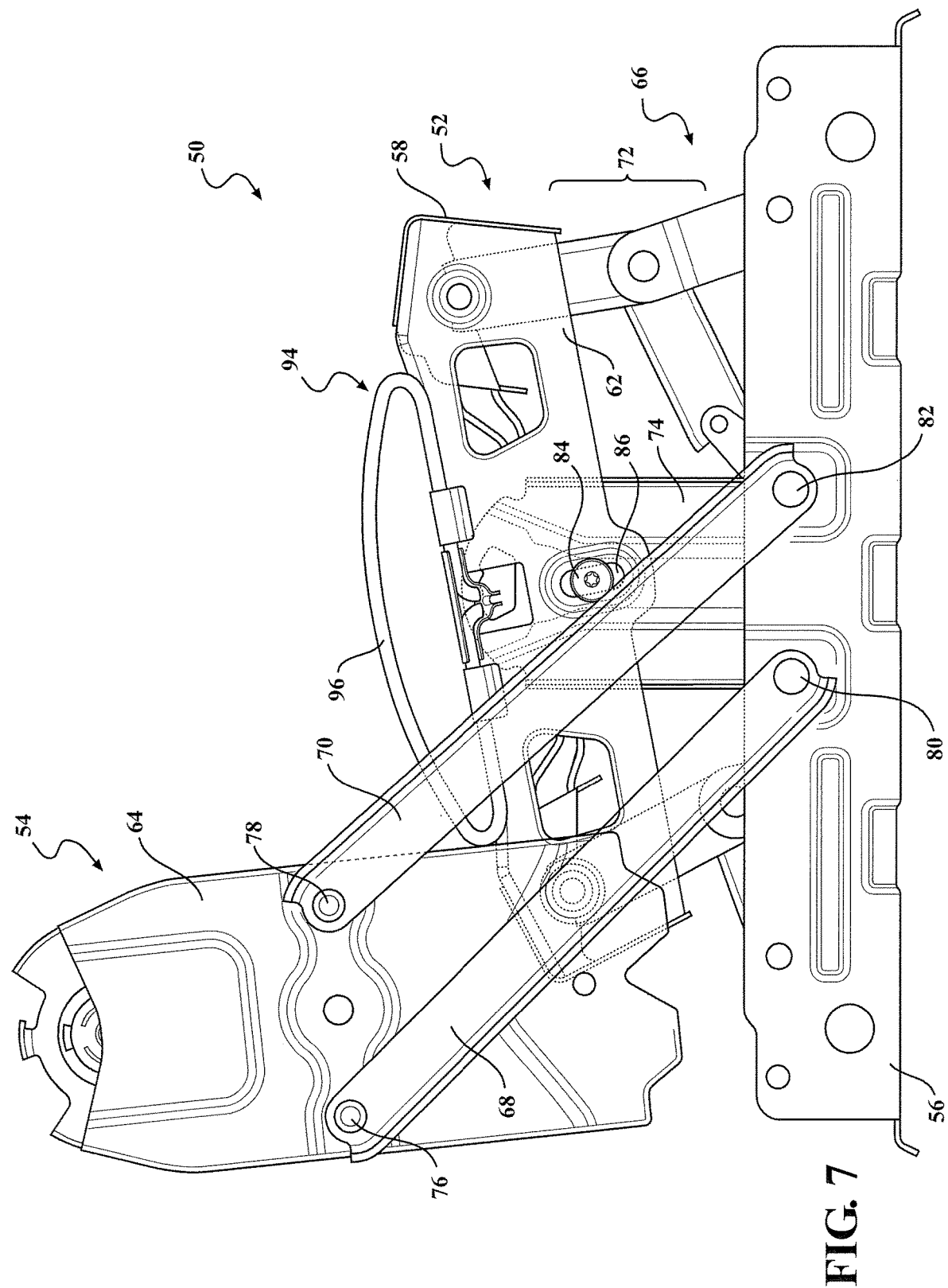
FIG. 7 is a fragmentary outer side view of the reversible seat assembly of FIG. 2 between the forward-facing seating position and the neutral position.
Figure 8:
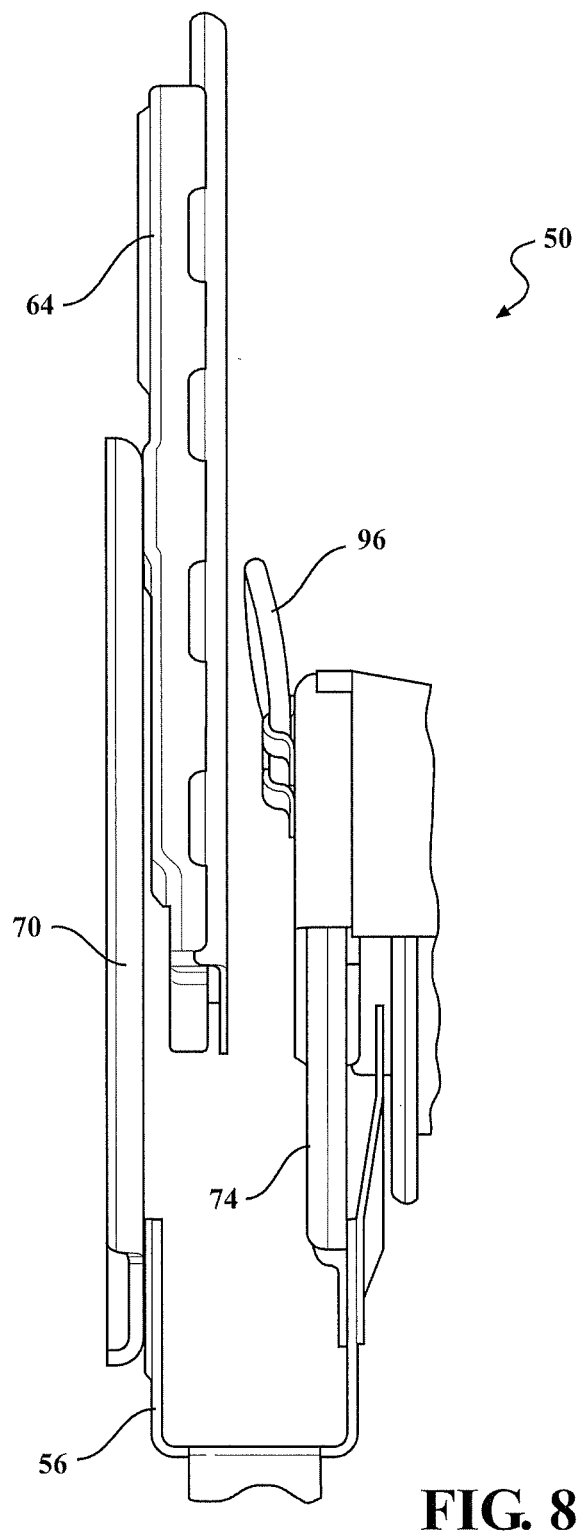
FIG. 8 is a fragmentary front view of the reversible seat assembly of FIG. 7.
Figure 9:
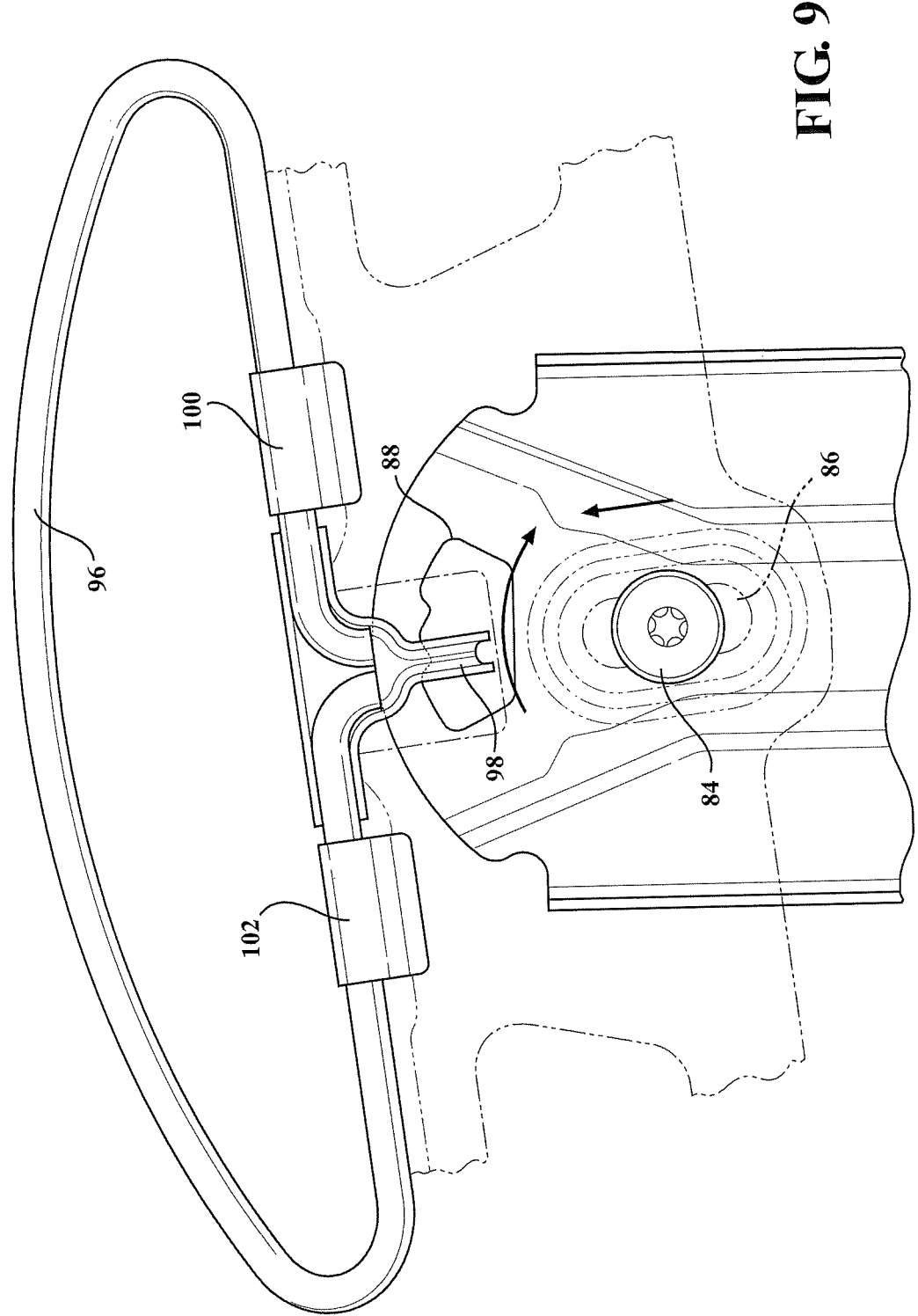
FIG. 9 is a fragmentary outer side view of the bolster assembly on the reversible seat assembly of FIG. 7.
Figure 10:
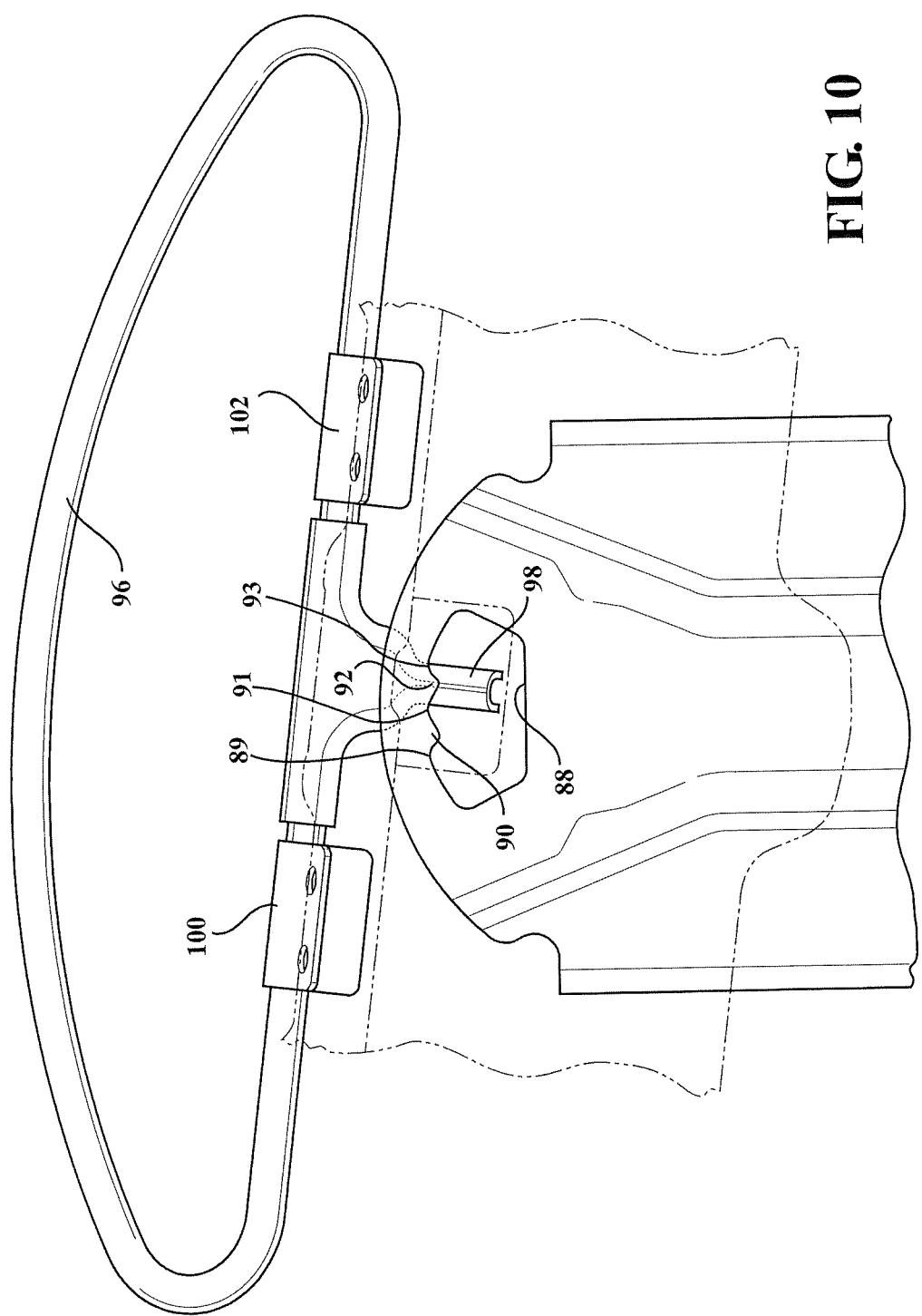
FIG. 10 is a fragmentary inner side view of the bolster assembly on the reversible seat assembly of FIG. 7.
Figure 11:
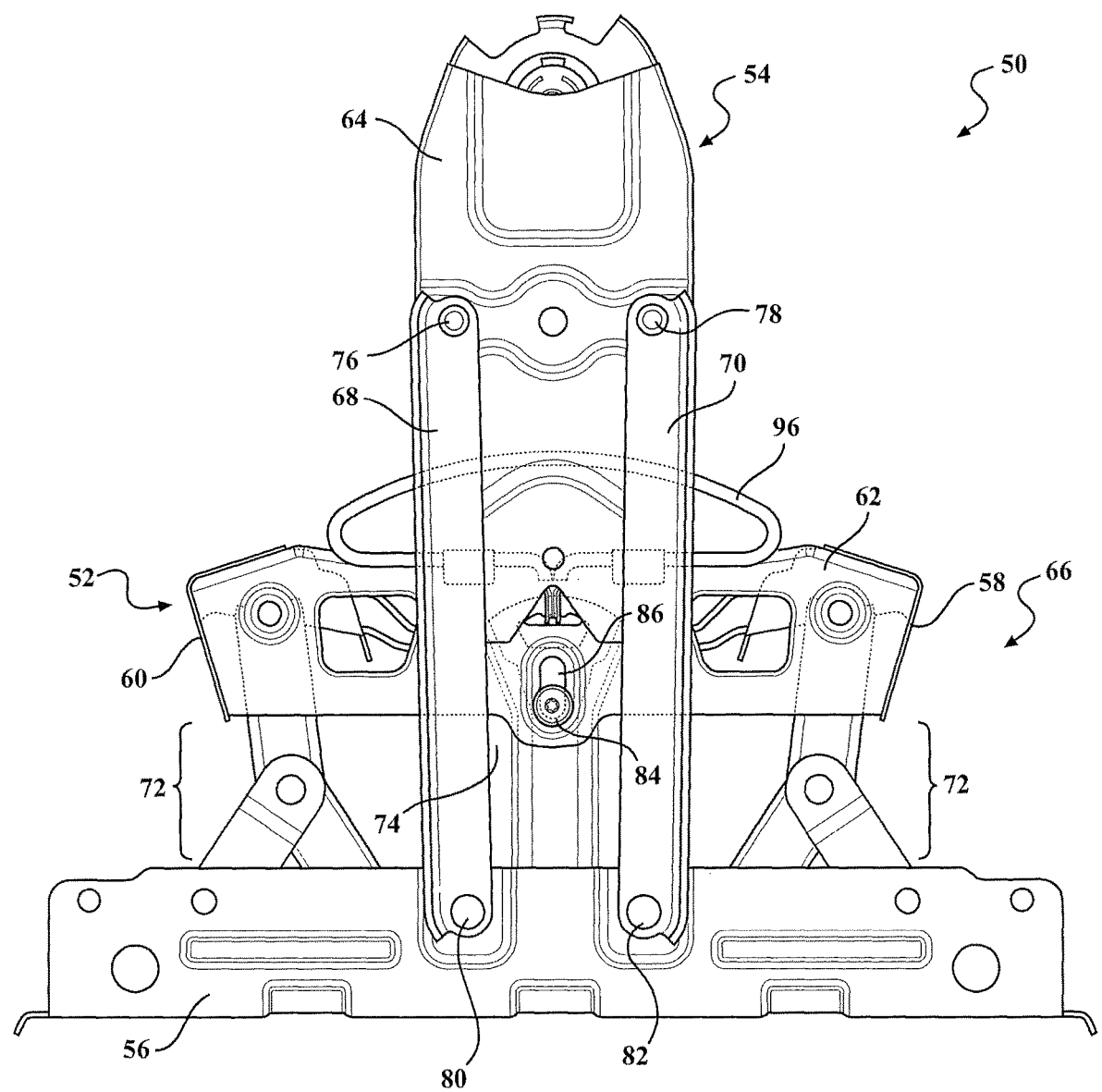
FIG. 11 is a fragmentary outer side view of the reversible seat assembly of FIG. 2 in the neutral position.
Figure 12:
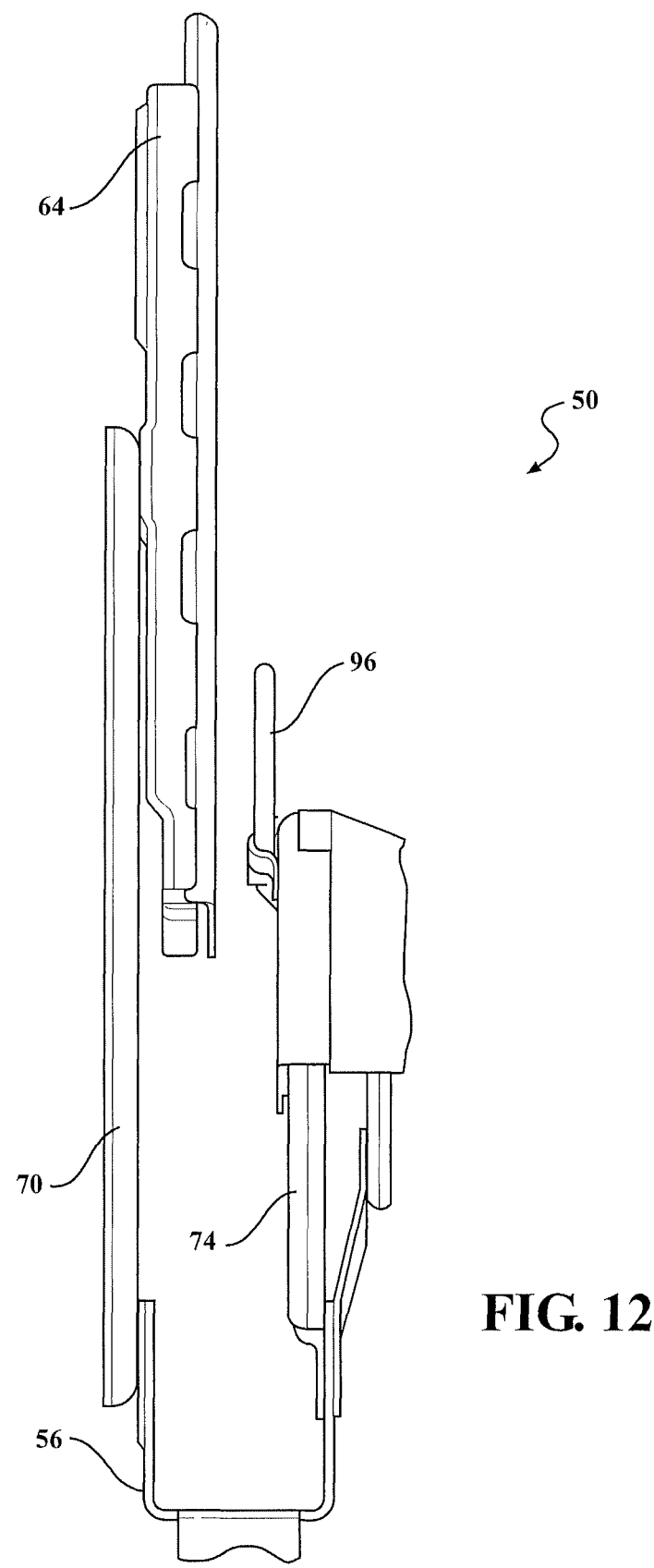
FIG. 12 is a fragmentary front view of the reversible seat assembly of FIG. 11.
Figure 13:
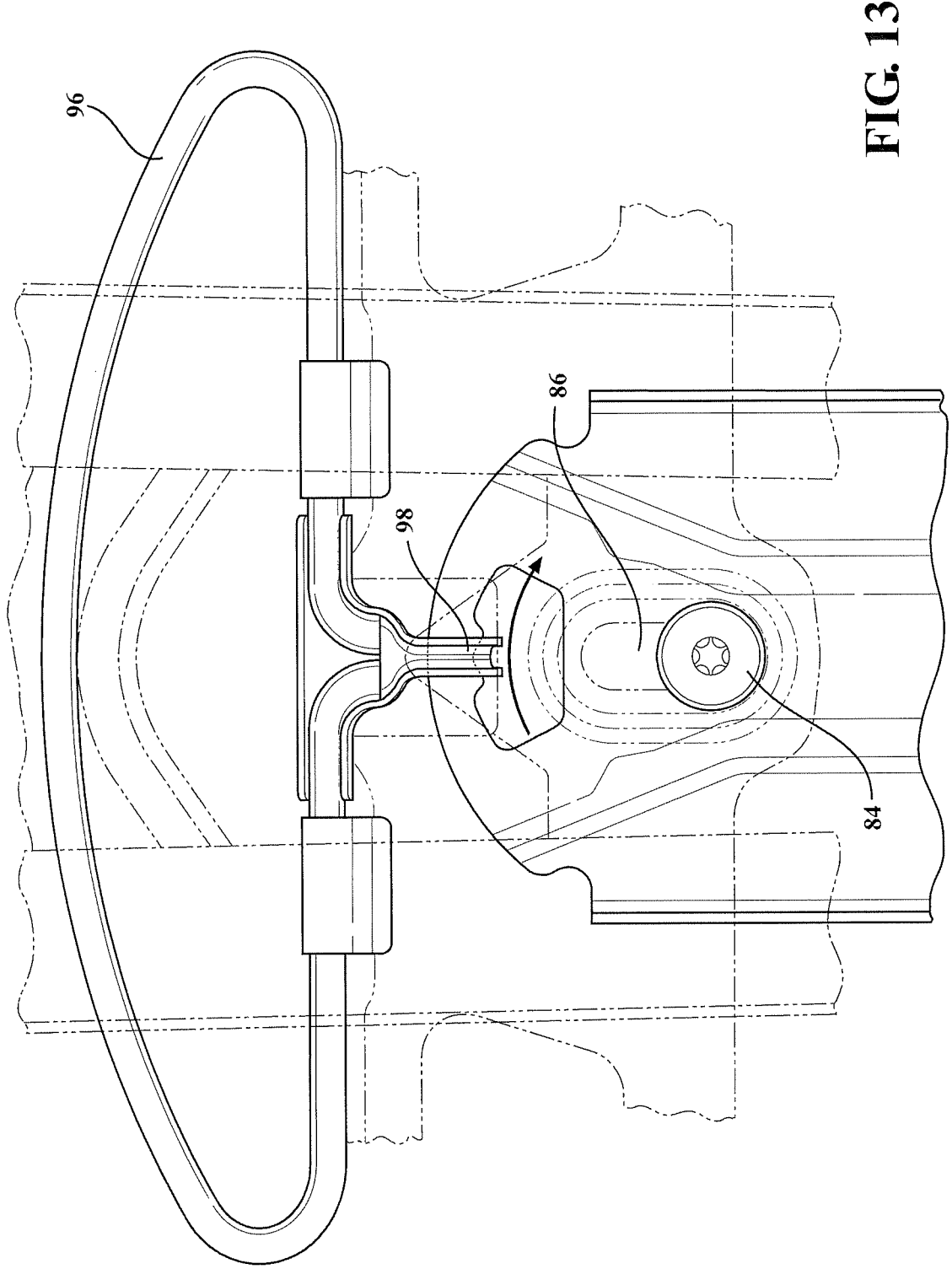
FIG. 13 is a fragmentary outer side view of the bolster assembly on the reversible seat assembly of FIG. 11.
Figure 14:
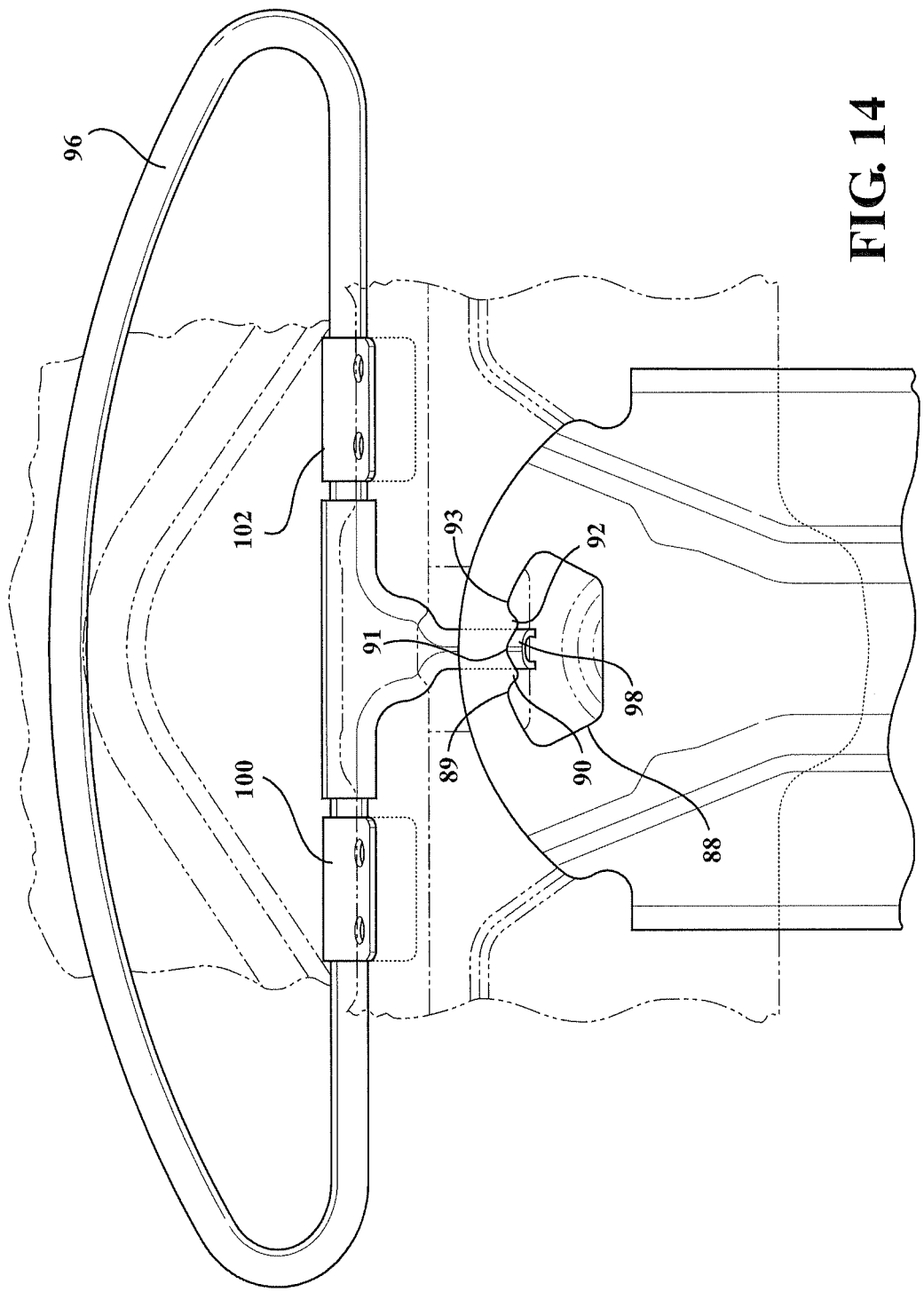
FIG. 14 is a fragmentary inner side view of the bolster assembly on the reversible seat assembly of FIG. 11.
Figure 15:
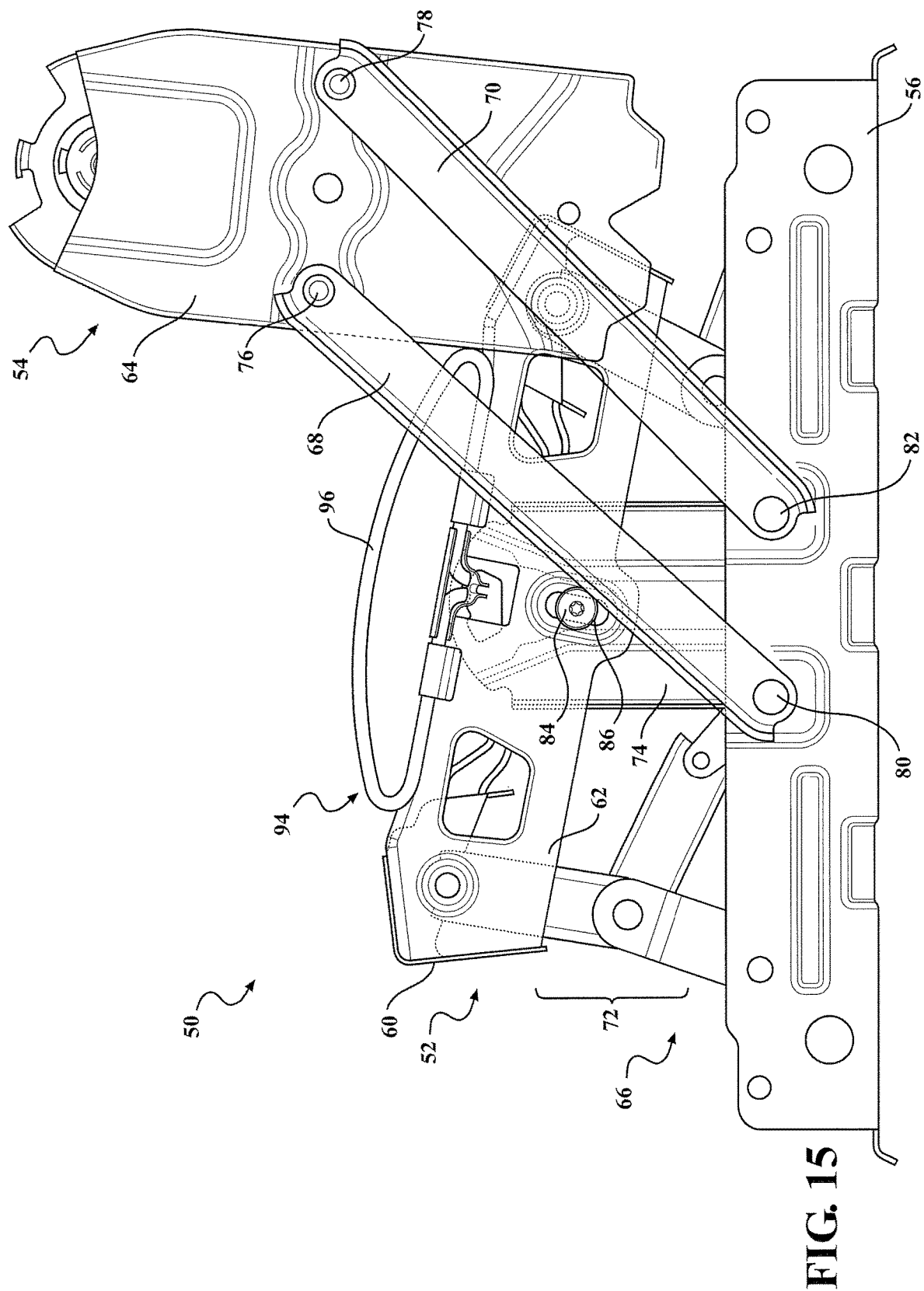
FIG. 15 is a fragmentary outer side view of the reversible seat assembly of FIG. 2 between the neutral position and the rearward-facing seating position.
Figure 16:
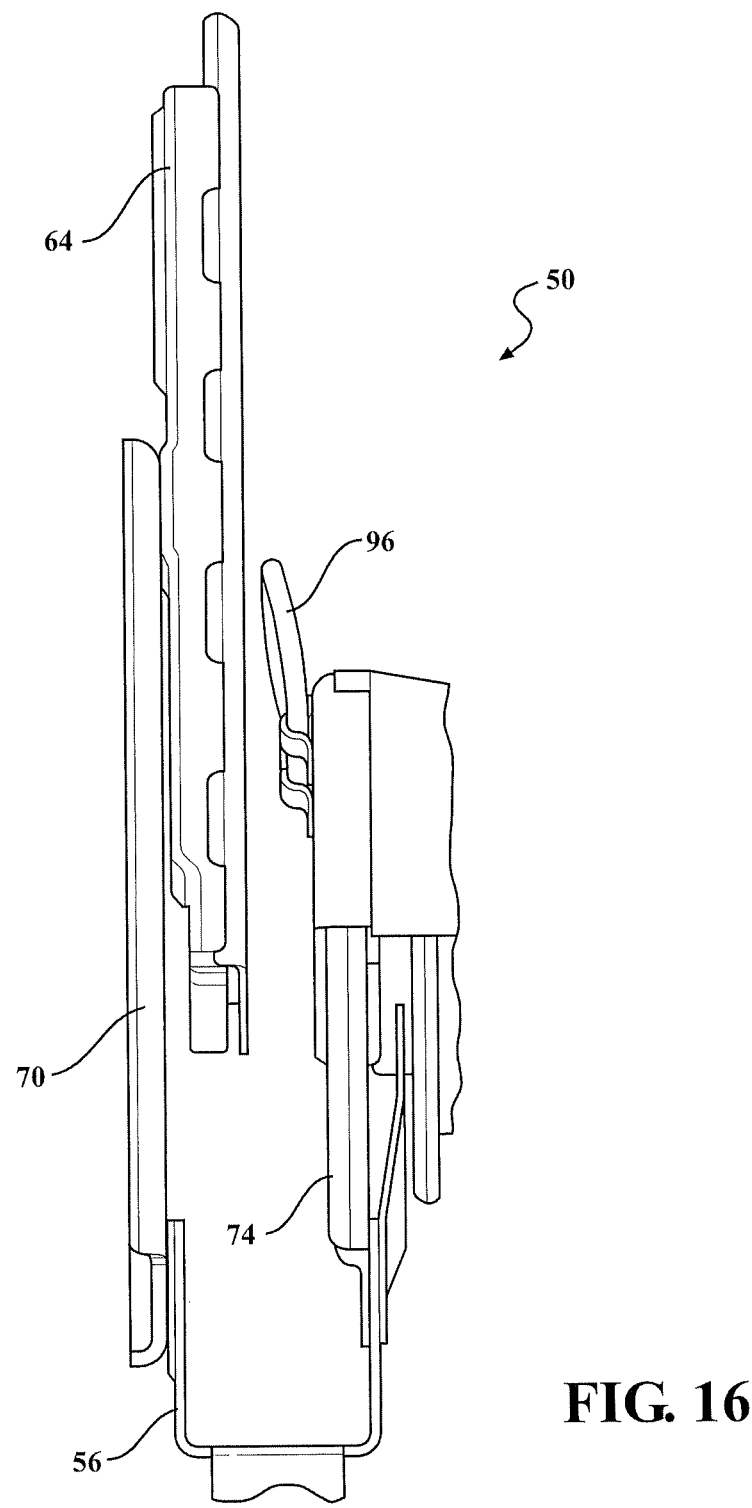
FIG. 16 is a fragmentary front view of the reversible seat assembly of FIG. 15.
Figure 17:
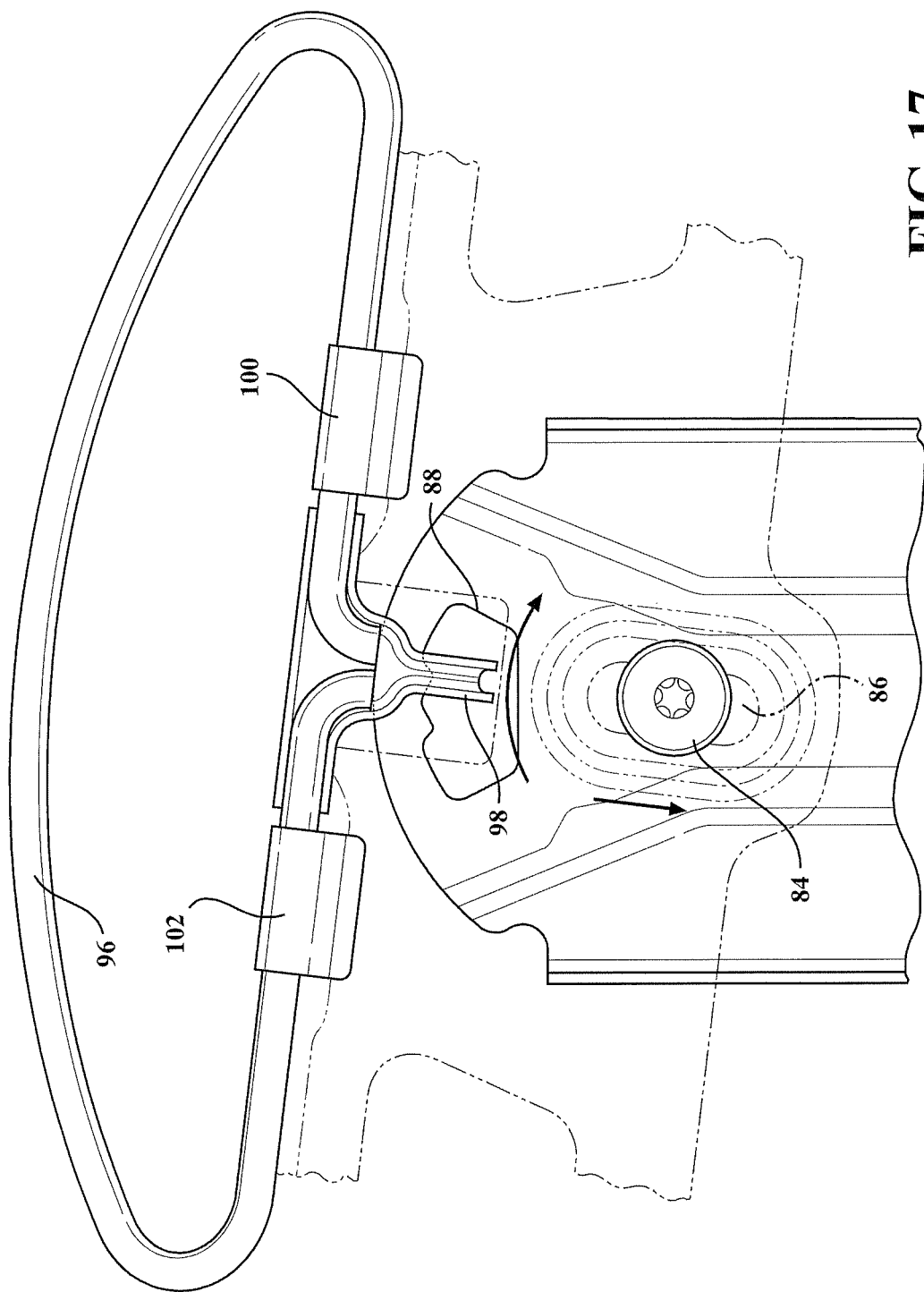
FIG. 17 is a fragmentary outer side view of the bolster assembly on the reversible seat assembly of FIG. 15.
Figure 18:
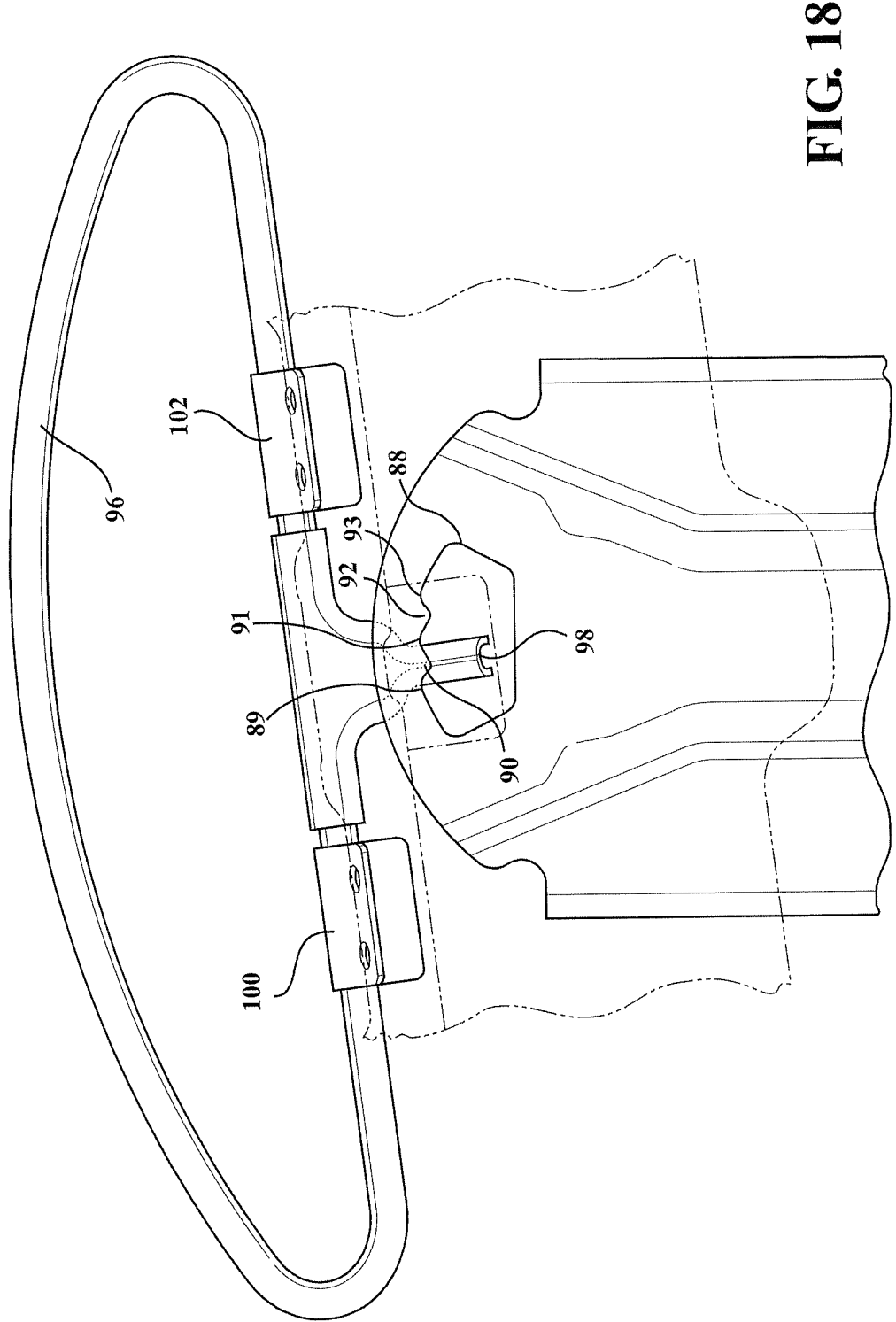
FIG. 18 is a fragmentary inner side view of the bolster assembly on the reversible seat assembly of FIG. 15.
Figure 19:
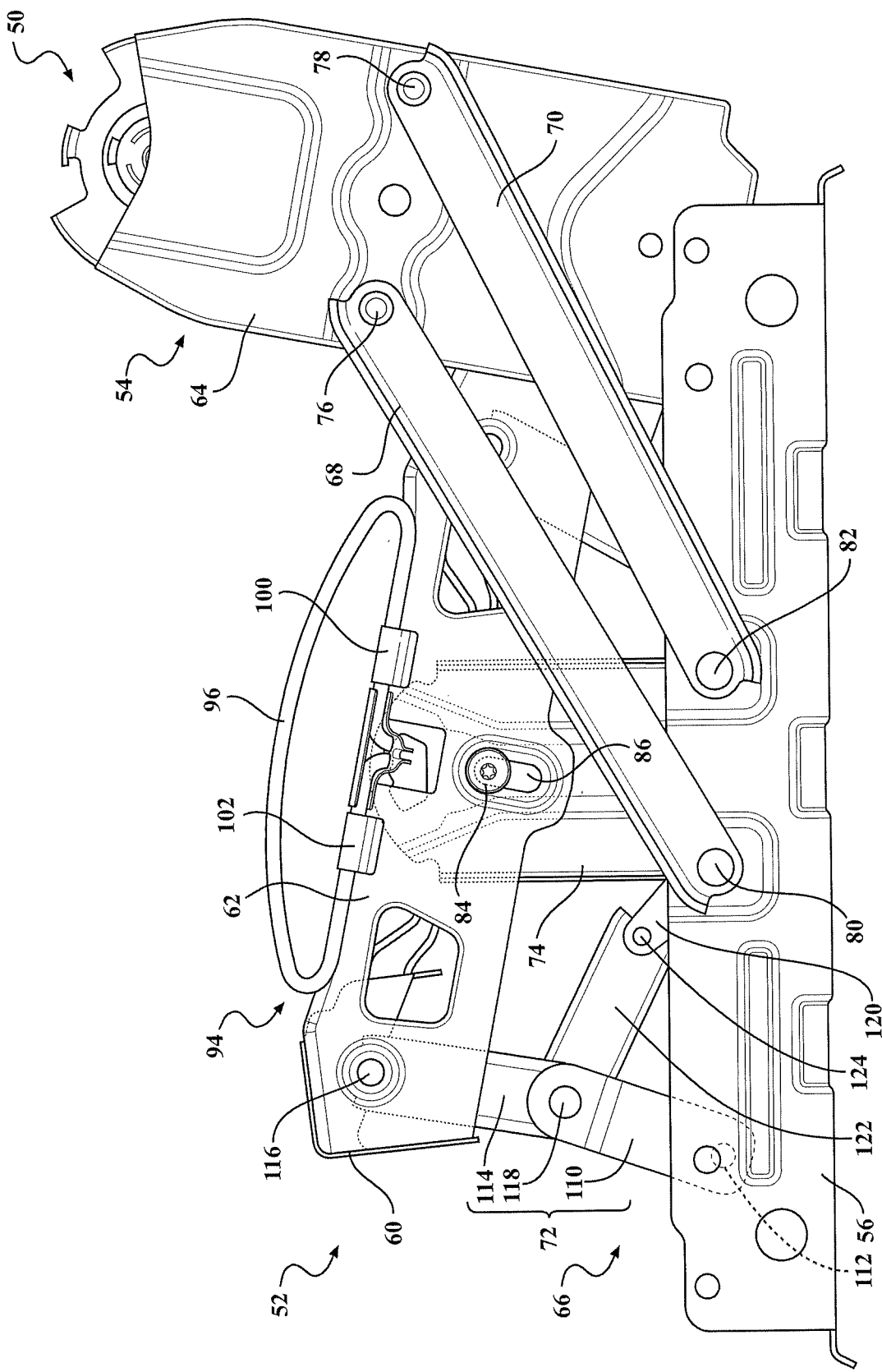
FIG. 19 is a fragmentary outer side view of the reversible seat assembly of FIG. 2 in the rearward-facing seating position.
Figure 20:
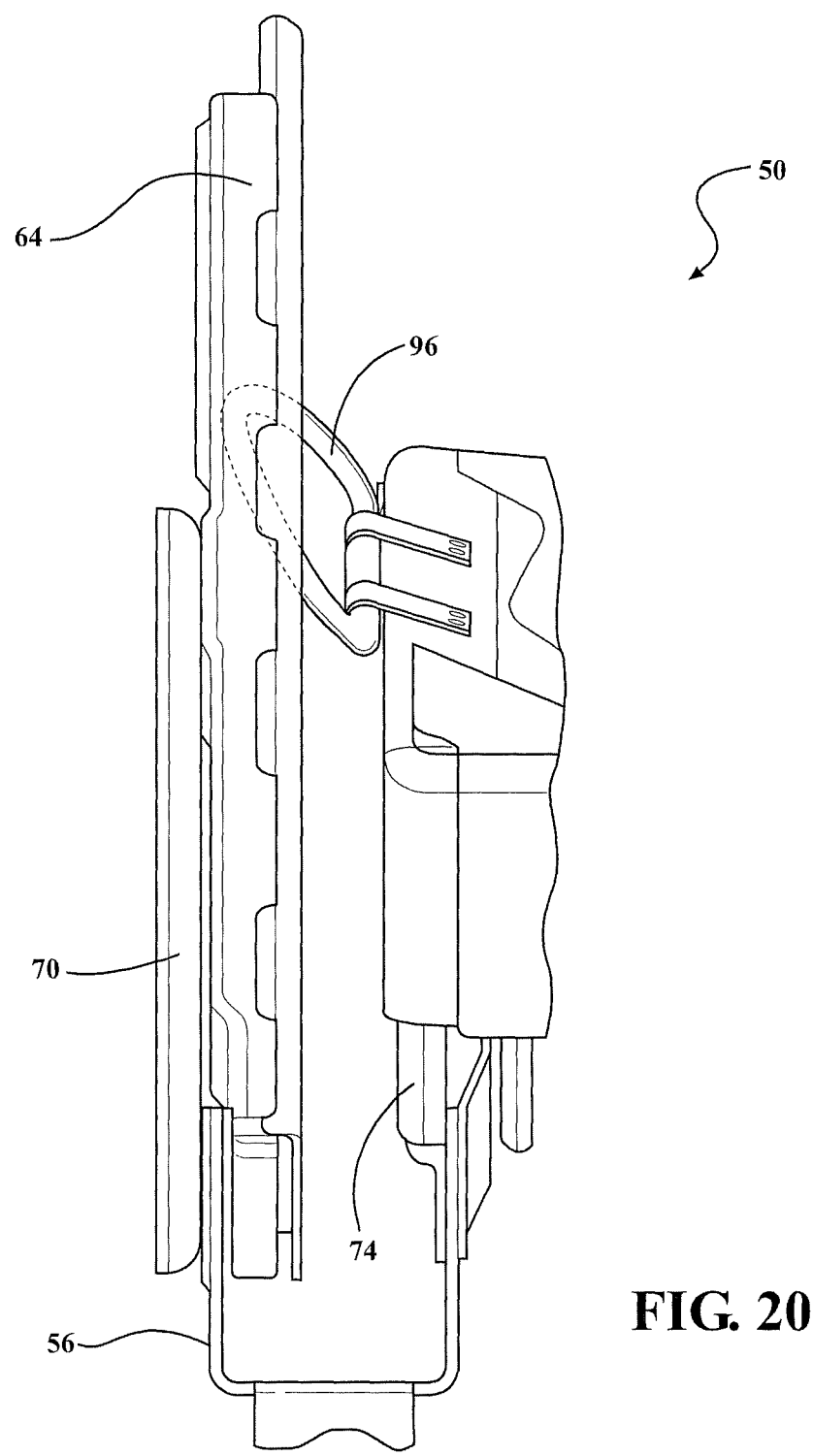
FIG. 20 is a fragmentary front view of the reversible seat assembly of FIG. 19.
Figure 21:
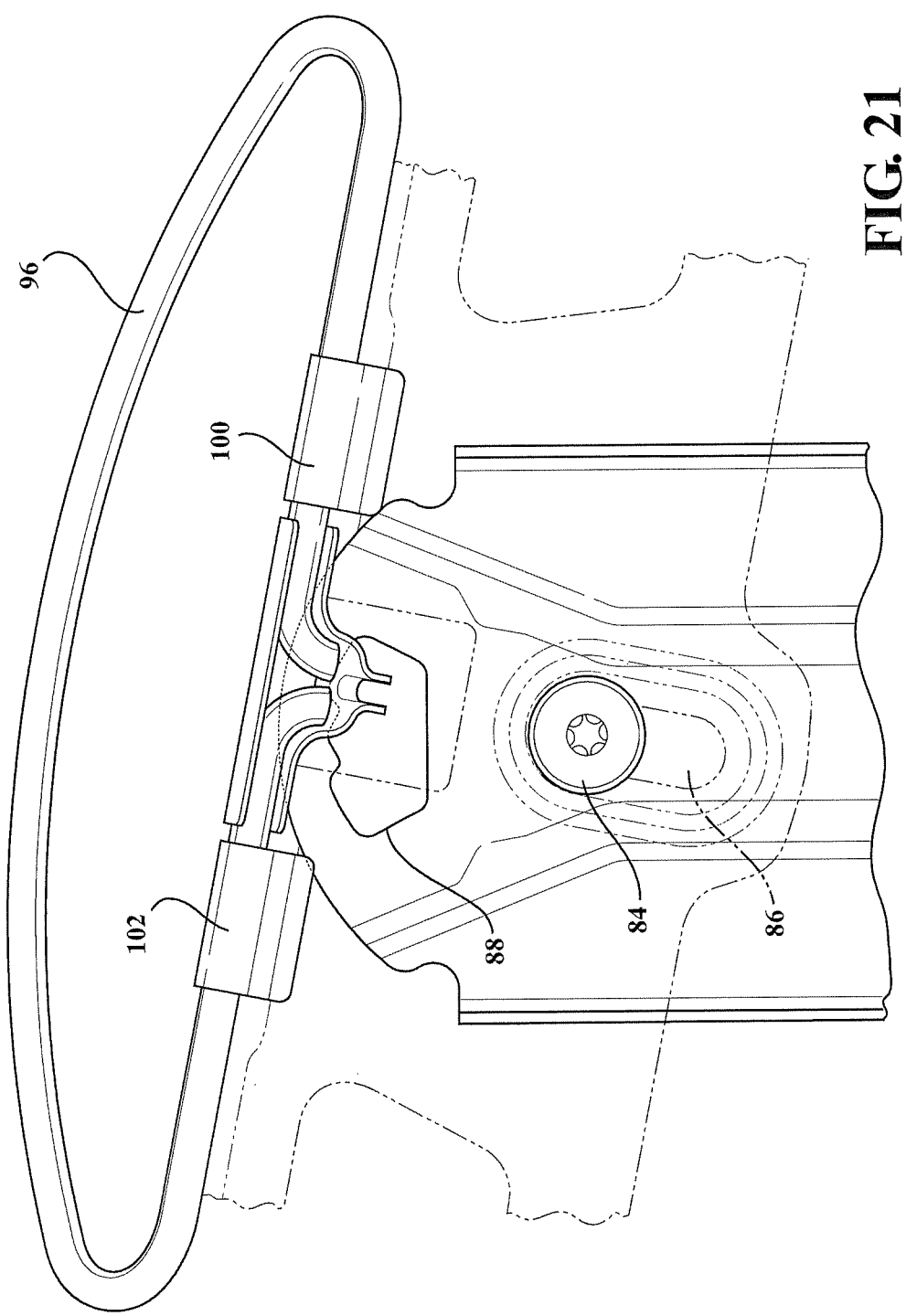
FIG. 21 is a fragmentary outer side view of the bolster assembly on the reversible seat assembly of FIG. 19.
Figure 22:
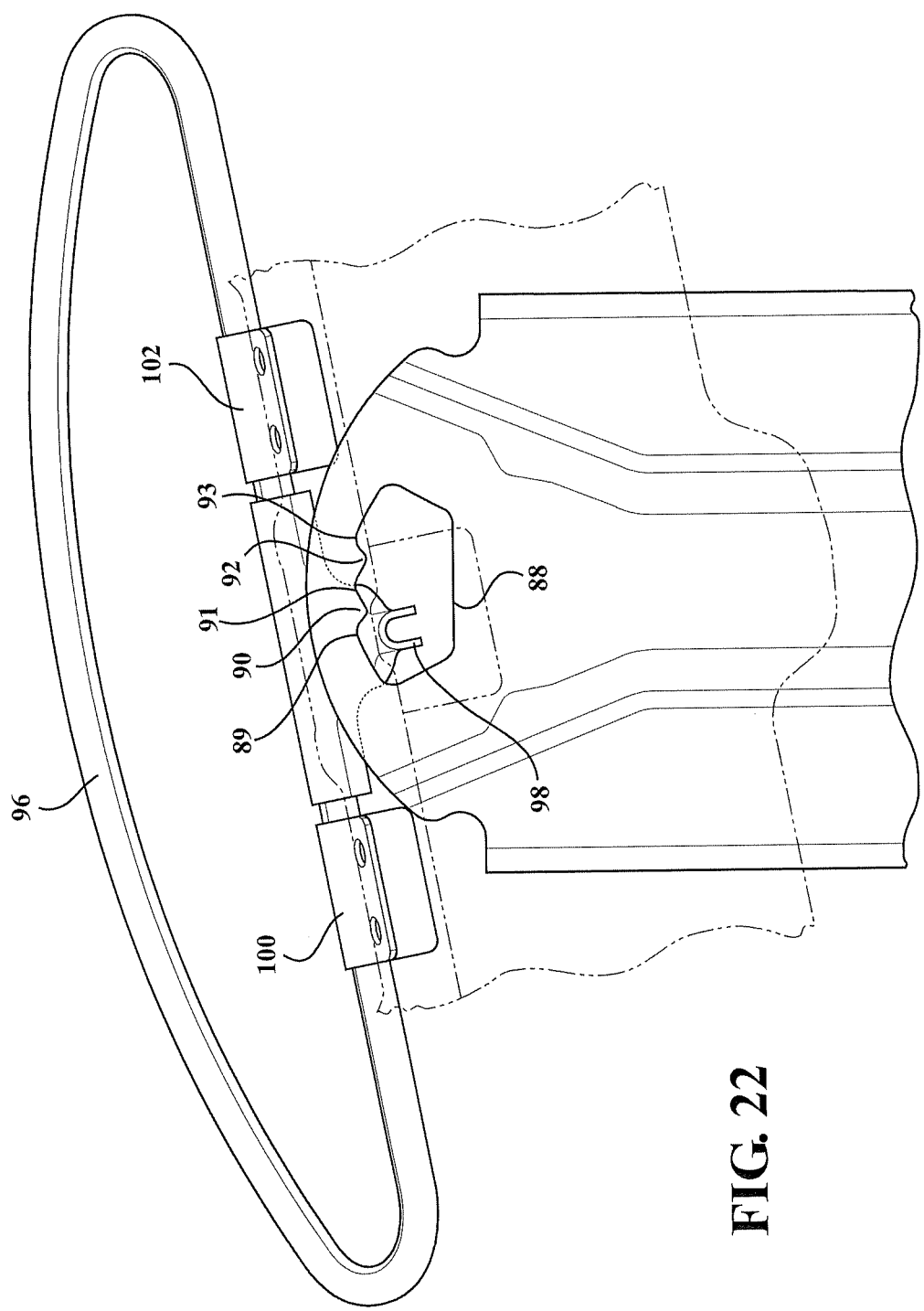
FIG. 22 is a fragmentary inner side view of the bolster assembly on the reversible seat assembly of FIG. 19.

Referring to FIGS. 2 and 19, the cushion linkages 72 operatively couple the respective front end 58 of the seat cushion 52 to the seat riser 56 and the reversing link 70 and the rear end 60 of the seat cushion 52 to the seat riser 56 and the reversing link 68. Each cushion linkage 72 includes a lower leg 110 extending longitudinally between a first end pivotally coupled to the seat riser 56 at 112 and an opposite second end and an upper leg 114 extending longitudinally between a first end pivotally coupled to the seat cushion frame 62 at 116 and an opposite second end pivotally coupled to the second end of the lower leg 110 at pivot 118. The cushion linkages 72 further include a first drive link 120 extending longitudinally between a first end fixedly coupled to one of the respective reversing links 68, 70 at the pivot 80, 82 and an opposite second end and a second drive link 122 extending longitudinally between a first end pivotally coupled to the second end of the first drive link 120 at pivot 124 and an opposite second end pivotally coupled to the second end of the upper leg 114 at the pivot 118.

The seat assembly 50 also includes at least one bolster 94 operatively coupled to the seat cushion 52 for movement between a deployed position when the seat back 54 is adjacent the rear or front end of the seat cushion 52 and a retracted position when the seat back 54 is between the rear and front ends of the seat cushion 52. The seat assembly 50 preferably includes a pair of bolsters 94, one operatively coupled to each of the opposing lateral sides of the seat cushion 52. The bolster 94 is biased towards the deployed position by springs and/or by the weight and placement of a compressed bolster foam (not shown). The bolster 94 includes a bolster wire 96 coupled to a bolster actuation bracket 98. A bolster wire 96 is pivotally coupled to each lateral side of the cushion frame 62 with bolster wire pivot brackets 100, 102.

FIGS. 2-22 illustrate the reversible seat assembly 50 of the present disclosure in a plurality of seating positions. In FIGS. 2-6, the seat assembly 50 is illustrated in a forward-facing seating position. Forward-facing is defined as the seat cushion 52 and seat back 54 positioned to support the seat occupant in a direction facing toward the front of the vehicle, as is commonly known. In the forward-facing seating position, the seat back 54 is in a first generally upright position with the lower end of the seat back 54 adjacent the rear end 60 of the seat cushion 52. The cushion linkages 72 position the seat cushion 52 in a first inclined position such that the front end 58 is spaced farther from the seat riser 56 than the rear end 60. The cushion frame pivot 84 is in the upper end of the elongated travel slot 86. Thus, the cushion frame 62 and the seat cushion 52 are at their lowest positions. The seat assembly 50 is locked in the forward-facing seating position via a seat back latch (not shown) which may be operatively coupled between the recliner bracket 64 and the seat riser 56. The bolster 94 is in the deployed position, and the bolster actuation bracket 98 is in the home position 93 of the actuation slot 88.

In operation, the seat assembly 50 is operable between the forward-facing and rearward-facing seating positions. The reversing links 68, 70 pivotally guide and move the seat back 54 between the forward-facing position shown in FIG. 2 and the rearward-facing position shown in FIG. 19. The reversing links 68, 70 also automatically drive the seat cushion 52 to rotate about the cushion frame pivot 84. That is, the reversing links 68, 70 drive the first drive links 120 to rotate with the reversing links 68, 70. The first drive links 120 in turn pivot the second drive links 122 to either pull on the pivot 118 to collapse and fold the lower and upper legs 110, 114 as shown along the rear end of the seat cushion 52 in FIG. 2 or push on the pivot 118 to extend and straighten the lower and upper legs 110, 114 as shown along the front end of the seat cushion 52 in FIG. 2 and thus alternating the incline of the seat cushion 52 between the forward-facing and rearward-facing positions.

More specifically, during the reversing process, as the seat back 54 moves from the forward-facing seating position to the neutral position, the cushion frame 62, and thus the seat cushion 52, moves up along the travel slot 86 as the cushion frame 62 rotates about the cushion frame pivot 84. The upward movement of the cushion frame 62 forces the bolster actuation bracket 98 downwards, thus rotating the bolster wire 96, and hence the bolster 94, inwardly toward the retracted position. At the same time, the rotational movement of the cushion frame 62 causes the bolster actuation bracket 98 to glide along the profile of the actuation slot 88 from the home position 93 downwards towards the peak of projection 92. The net effect is an increased rate of downward movement of the bolster actuation bracket 98, and a corresponding increased rate of rotation of the bolster wire 96 and bolster 94. When the bolster actuation bracket 98 reaches the peak of projection 92, the bolster wire 96 is in a partially retracted position and the seat assembly 50 is between the forward-facing and the neutral position, as depicted in FIGS. 7-10.

As the reversing process continues, the cushion frame 62 and seat cushion 52 continue to rise and rotate about the cushion frame pivot 84. The continued upward movement of the cushion frame 62 forces the bolster actuation bracket 98 downwards further. At the same time, the rotational movement of the cushion frame 62 causes the bolster actuation bracket 98 to move upward from the peak of projection 92 toward the neutral position 91. Because the effect of the upward movement of the cushion frame 62 on the bolster actuation bracket 98 exceeds the upward movement of the bolster actuation bracket 98 along the profile of the actuation slot 88, the net effect is a decreased rate of downward movement of the bolster actuation bracket 98, and a corresponding decreased rate of rotation of the bolster wire 96 and the bolster 94. When the bolster actuation bracket 98 reaches the neutral position 91 between projections 92 and 90, the bolster wire 96 is in a fully retracted position and the seat assembly 50 is in the neutral position, as depicted in FIGS. 11-14. At this point, the cushion frame 62 and seat cushion 52 are in a horizontal orientation, and they are at their highest position where the cushion frame pivot 84 is in the lower end of the travel slot 86.

As the seat assembly 50 continues from the neutral position towards the rearward-facing position, the cushion frame 62 and seat cushion 52 start to move downward along the travel slot 86 as the cushion frame 62 continues to rotate about the cushion frame pivot 84. Because bolster 94 is biased towards the deployed position, the downward movement of the cushion frame 62 allows the bolster actuation bracket 98 to move upwards. At the same time, the rotational movement of the cushion frame 62 causes the bolster actuation bracket 98 to glide along the profile of the actuation slot 88 from the neutral position 91 downwards towards the peak of projection 90. Because the effect of the downward movement of the cushion frame 62 on the bolster actuation bracket 98 exceeds the downward movement of the bolster actuation bracket 98 along the profile of the actuation slot 88, the net effect is a decreased rate of upward movement of the bolster actuation bracket 98, and a corresponding decreased rate of rotation of the bolster wire 96 and the bolster 94. When the bolster actuation bracket 98 reaches the peak of projection 90, the bolster wire 96 is in the partially retracted position and the seat assembly 50 is between the neutral position and the rearward-facing seating position, as depicted in FIGS. 15-18.

As the reversing process continues, the cushion frame 62 and seat cushion 52 continue to move downward along the travel slot 86 as the cushion frame 62 continues to rotate about the cushion frame pivot 84. The continued downward movement of the cushion frame 62 allows the bolster actuation bracket 98 to move upwards further. At the same time, the rotational movement of the cushion frame 62 causes the bolster actuation bracket 98 to move upward from the peak of projection 90 towards the home position 89. The net effect is an increased rate of upward movement of the bolster actuation bracket 98, and a corresponding increased rate of rotation of the bolster wire 96 and bolster 94. When the bolster actuation bracket 98 reaches the home position 89, the bolster wire 96 is in the deployed position and the seat assembly 50 is in a rearward-facing seating position, as depicted in FIGS. 19-22. Rearward-facing is defined as the seat cushion 52 and seat back 54 positioned to support the seat occupant in a direction facing toward the rear of the vehicle. At this point, the seat assembly 50 may be re-locked in the rearward-facing seating position via the seat back latch (not shown).

As discussed above, as the seat back 54 moves from the forward-facing seating position to the neutral position, the bolster actuation bracket 98 has an increased rate of downward movement as it moves from home position 93 to the peak of projection 92, and it has a decreased rate of downward movement as it moves from the peak of projection 92 to neutral position 91. As a result, the rate of rotation of the bolster 94 accelerates as it moves from the deployed position toward the partially retracted position, and it decelerates as it moves from the partially retracted position to the fully retracted position. The acceleration towards the partially retracted position ensures that the recliner bracket 64 clears the bolster 94 as it translates between the forward-facing and neutral positions.

Likewise, as the seat back 54 is moving from the neutral position to the rearward-facing seating position, the bolster actuation bracket 98 has a decreased rate of upward movement as it moves from neutral position 91 to the peak of projection 90, and it has an increased rate of upward movement as it moves from the peak of projection 90 to home position 89. As a result, the rate of rotation of the bolster 94 decelerates as it moves from the fully retracted position to the partially retracted position, and it accelerates as it moves from the partially retracted position to the deployed position. The deceleration towards the partially retracted position ensures that the recliner bracket 64 clears the bolster 94 as it translates between the neutral and rearward-facing positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A reversible seat assembly for use in an automotive vehicle comprising:
   a seat cushion extending between a front end and a rear end of the seat cushion;
   a seat back;
   at least one bolster rotatably supported on a lateral side of the seat cushion and operatively coupled to the seat cushion for movement between a deployed position when the seat back is adjacent the rear or front end of the seat cushion and a retracted position when the seat back is between the rear and front ends of the seat cushion; and
   a linkage operatively coupling the seat back with the seat cushion and the bolster;
   wherein the linkage rotates the bolster laterally inward towards the retracted position when the seat back is moved from the rear or front end towards a neutral position between the rear and front ends.

2. The reversible seat assembly of claim 1, wherein the bolster retracts to clear a path for the seat back as the seat back moves from the rear end of the seat cushion to the front end of the seat cushion.

3. The reversible seat assembly of claim 1, wherein the seat cushion rises as the seat back moves from the rear end of the seat cushion to a neutral position between the rear end of the seat cushion and the front end of the seat cushion.

4. The reversible seat assembly of claim 3, wherein the seat cushion lowers as the seat back moves from the neutral position to the front end of the seat cushion.

5. The reversible seat assembly of claim 1, wherein the seat cushion rises as the seat back moves from the front end of the seat cushion to a neutral position between the front end of the seat cushion and the rear end of the seat cushion.

6. The reversible seat assembly of claim 5, wherein the seat cushion lowers as the seat back moves from the neutral position to the rear end of the seat cushion.

7. The reversible seat assembly of claim 1 wherein the seat back comprises a recliner bracket, the reversible seat assembly further comprising:
a seat riser; and
a plurality of reversing links extending between an upper end pivotally coupled to the recliner bracket and a lower end pivotally coupled to the seat riser;
wherein the front end of the seat cushion is spaced further from the seat riser than the rear end of the seat cushion when the seat back is adjacent the rear end of the seat cushion.

8. The reversible seat assembly of claim 7 wherein the rear end of the seat cushion is spaced further from the seat riser than the front end of the seat cushion when the seat back is adjacent the front end of the seat cushion.

9. A reversible seat assembly for use in an automotive vehicle comprising:
a seat cushion;
a seat back;
a linkage operatively coupling the seat back with the seat cushion; and
at least one bolster rotatably supported on a lateral side of the seat cushion and operatively coupled with the linkage, the bolster having a retracted position and a deployed position;
wherein the linkage moves the seat back between a forward-facing position and a rearward-facing position; and wherein the linkage rotates the bolster laterally inward towards the retracted position when the seat back is moved towards a neutral position between the forward-facing position and the rearward-facing position.

10. The reversible seat assembly of claim 9, wherein the linkage moves the bolster into the deployed position when the seat back is in the forward-facing position or the rearward-facing position.

11. The reversible seat assembly of claim 9, wherein the linkage moves the bolster towards the retracted position to clear a path for the seat back as the seat back moves between the forward-facing position and the rearward-facing position.

12. The reversible seat assembly of claim 9, wherein the linkage raises the seat cushion as the seat back moves from the forward-facing position to the neutral position.

13. The reversible seat assembly of claim 12, wherein the linkage lowers the seat cushion as the seat back moves from the neutral position to the rearward-facing position.

14. The reversible seat assembly of claim 9, wherein the linkage raises the seat cushion as the seat back moves from the rearward-facing position to the neutral position.

15. The reversible seat assembly of claim 14, wherein the linkage lowers the seat cushion as the seat back moves from the neutral position to the forward-facing position.

16. The reversible seat assembly of claim 9 further comprising a seat riser below the seat cushion, wherein the linkage moves a front end of the seat cushion further from the seat riser than a rear end of the seat cushion when the seat back is in the forward-facing position.

17. The reversible seat assembly of claim 16 wherein the linkage moves the rear end of the seat cushion further from the seat riser than the front end of the seat cushion when the seat back is in the rearward-facing position.

\* \* \* \* \*